(12) United States Patent  
Von Allmen et al.

(10) Patent No.: US 8,191,444 B2
(45) Date of Patent: Jun. 5, 2012

(54) MECHANICAL CONTROL DEVICE ESPECIALLY FOR CONTROLLING A HIGH-VOLTAGE OR MEDIUM-VOLTAGE DISCONNECTOR

(75) Inventors: Peter Von Allmen, Buchs (CH); Martin Zeugin, Ueken (CH)

(73) Assignee: Areva T&D AG, Oberentfelden (CH)

( * ) Notice: Subject to any disclaimer, the term of this patent is extended or adjusted under 35 U.S.C. 154(b) by 365 days.

(21) Appl. No.: 12/641,250

(22) Filed: Dec. 17, 2009

(65) Prior Publication Data

US 2010/0155214 A1 Jun. 24, 2010

(30) Foreign Application Priority Data

Dec. 22, 2008 (FR) ...................................... 08 58927

(51) Int. Cl.
 *B23Q 16/02* (2006.01)
(52) U.S. Cl. ........... 74/650; 74/816; 74/436; 200/11 TC
(58) Field of Classification Search .................... 74/650, 74/816, 822, 826, 436; 200/11 TC
See application file for complete search history.

(56) References Cited

U.S. PATENT DOCUMENTS

| 2,534,724 | A | | 12/1950 | Miller |
| 2,605,647 | A | | 8/1952 | Duvoisin |
| 3,590,175 | A | | 6/1971 | Bleibtreu et al. |
| 4,683,768 | A | * | 8/1987 | Budinski ....................... 74/411.5 |
| 4,724,760 | A | * | 2/1988 | Bubley ........................... 101/115 |
| 4,765,196 | A | * | 8/1988 | Russ ................................ 74/436 |
| 4,869,126 | A | * | 9/1989 | Russ ........................... 74/665 GA |
| 6,008,456 | A | * | 12/1999 | Pillmeier ................... 200/11 TC |
| 6,087,607 | A | * | 7/2000 | Dohnal et al. ................. 200/574 |
| 2006/0105880 | A1 | | 5/2006 | Gacond et al. |

FOREIGN PATENT DOCUMENTS

FR 2 482 361 12/1981

OTHER PUBLICATIONS

French search report for French Application No. 08 58927, dated Jul. 17, 2009.

* cited by examiner

*Primary Examiner* — Ha D. Ho
(74) *Attorney, Agent, or Firm* — Nixon Peabody LLP

(57) ABSTRACT

A control device, including a transmission shaft adapted to be coupled to an apparatus to be controlled, a driving disk mounted on said transmission shaft to rotate thereon and driven in rotation by a motor unit, a driven disk constrained to rotate with said transmission shaft, and a rotary member carrying at least one indexing means which, due to rotation of said rotary member, can be simultaneously engaged into two respective slots of said two disks for said transmission shaft to be driven in rotation, and can be disengaged from one of said slots for said transmission shaft to be locked against rotation.

13 Claims, 6 Drawing Sheets

MECHANICAL CONTROL DEVICE ESPECIALLY FOR CONTROLLING A HIGH-VOLTAGE OR MEDIUM-VOLTAGE DISCONNECTOR

CROSS REFERENCE TO RELATED APPLICATIONS or PRIORITY CLAIM

This application claims priority of French Patent Application No. 08 58927, filed Dec. 22, 2008.

TECHNICAL FIELD

The present invention relates to the field of mechanical control devices for electrical switchgear, in particular for disconnectors for high-voltage or medium-voltage circuits, and relates more generally to the field of mechanical control devices of the type comprising means for driving a transmission shaft in rotation and means for locking that shaft in a discrete series of predetermined angular positions.

High-voltage and medium-voltage disconnectors are used to isolate a portion of a live electrical network, such as a high-voltage line, an electrical transformer, or a portion of an electrical substation, for example, so that an operative can access it safely.

These disconnectors include a contactor movable between a position for opening an electrical circuit and a position for closing the electrical circuit. Some disconnectors have a dedicated grounding third position and the contactor thereof is then also movable between said opening position and said grounding position.

Devices for controlling disconnectors must be particularly reliable in order to minimize the risks of malfunction and of damaging the disconnectors and the risk of accidents faced by operatives working on high-voltage and medium-voltage lines and switchgear.

Three-position disconnector control devices must in particular be designed to prevent any direct passage from the closed position to the grounding position, and vice-versa, and conversely must oblige the disconnector to pass through the opening position when it leaves its closed position or its grounding position.

To achieve a high level of reliability, these devices incorporate complex mechanisms in which numerous mechanical parts cooperate, which makes these devices relatively costly, heavy and bulky.

DESCRIPTION OF THE PRIOR ART

A control device of this type is described in the document EP 1 659 601 A1, for example. The device includes a transmission shaft that carries a slotted disk and includes means for coupling it to the movable contactor of electrical switchgear with three switching positions. The device also includes an auxiliary shaft on which there is mounted a toothed wheel that is driven in rotation by an electric motor and that carries two diagonally opposite rollers.

In operation, the transmission shaft alternates between rotation phases in which one of the rollers is engaged in a slot in the slotted disk and drives said disk in rotation and immobilization phases in which none of the rollers is engaged in a slot in the slotted disk. The toothed wheel and the slotted disk therefore together form a "Geneva wheel mechanism", sometimes also called a "Maltese cross mechanism". During phases of immobilization of the transmission shaft, the shaft is in one of the three switching positions and is locked against rotation by locking means.

Moreover, the device described in the above-mentioned document can further include means for limiting the torque transmitted by the electric motor to the transmission shaft.

These torque limiter means are mounted on the transmission shaft and limit the risk of damage to the control device in the event of an incident, such as jamming of the movable contactor of the electrical switchgear to which the device is coupled.

However, such means have the drawback of being heavy and bulky, which is necessary because they are mounted on the transmission shaft and because of the high torque transmitted by the shaft.

Now, in a manner that is inherent to Geneva wheel mechanisms, the torque transmission ratio between the auxiliary shaft and the transmission shaft varies between a zero value and a maximum value during each phase of driving the transmission shaft in rotation, which limits the possibility of providing torque limiter means elsewhere than on the transmission shaft.

STATEMENT OF THE INVENTION

A particular object of the invention is to provide a simple, economic, and efficient solution to these problems that avoids the above-mentioned drawbacks.

In particular the invention provides a mechanical control device for controlling an apparatus, in particular for controlling electrical switchgear, that is relatively compact and relatively light in weight.

It also provides a mechanical control device in which the transmission ratio between a rotary driving member driven by a motor unit and a rotary driven member intended to drive coupling means is constant or varies only slightly, so that means for limiting the torque transmitted to the driven member can be provided between the motor unit and the driving member, in particular in the vicinity of the motor unit, in order to minimize the overall size and the mass of the torque limiter means.

To this end the invention proposes a control device, including coupling means adapted to be coupled to an apparatus to be controlled, said coupling means being rotatably movable and lockable in predetermined angular positions corresponding to different operating states of said apparatus to be controlled, this device comprising a driving disk driven in rotation about an axis by a motor unit, a driven disk mounted to rotate about said axis and constrained to rotate with said coupling means, and means for switching between a drive mode for driving said coupling means in rotation, in which said driving disk is mechanically connected to said driven disk in order to drive said driven disk in rotation, and a locking mode for locking the angular position of said coupling means, in which the two disks are freely rotatable relative to each other. Said switching means comprise a rotary member that is mounted to rotate about an axis parallel to said axis of said disks. Said rotary member carries at least one indexing means which, due to rotation of said rotary member, can be simultaneously engaged into two slots respectively formed in the peripheral edges of said two disks so as to induce a commutation into said drive mode, and can be disengaged from at least one of said slots so as to induce a commutation into said locking mode.

Said switching means enable mechanical connection of said two coaxial disks when changing the operating mode of the apparatus controlled by the device, so that the driving disk drives the driven disk in rotation, and thus also the coupling means of the device, and said switching means enable said two disks to rotate freely relative to each other when the coupling means have reached a position corresponding to the required operating mode of said apparatus, so that the driven disk and the coupling means are no longer driven in rotation, even if the driving disk continues to rotate until the motor unit stops.

Due to rotation of said rotary member, said at least one indexing means alternatively enables said two coaxial disks to be mechanically connected and then freed relative to each other, so as to drive the coupling means from a first angular position to a second angular position.

This configuration limits the amplitude of the variations in the transmission ratio between said driving disk and said driven disk in said driving mode.

In particular, in said driving mode the transmission ratio between said two disks is preferably in the range 0.5 to 1.5.

As becomes more clearly apparent below, this kind of range of values is advantageous in that it enables the torque applied to said driven disk to be increased, when necessary, by reducing the transmission ratio, at the same time as retaining a sufficiently high transmission ratio to avoid the problems encountered with the Geneva wheel mechanisms of the prior art devices.

In particular, in said driving mode, said two disks can advantageously be constrained to rotate together by said switching means.

In this situation, the driven disk, which is constrained to rotate with said coupling means, rotates in unison with the driving disk, which is driven by said motor unit, with the result that the transmission ratio between the two disks is equal to 1. Thus the transmission ratio between the motor unit and the coupling means is constant.

In one embodiment of the invention, said slots in the disks extend radially with the result that said two disks are constrained to rotate together in unison in said driving mode.

As mentioned above, the transmission ratio between the motor unit and the coupling means is therefore constant in said driving mode.

In another embodiment of the invention, at least one of said slots has a curved profile with the result that the transmission ratio between said two disks is less than 1 when switching to said driving mode in order to drive said coupling means from a first of said predetermined angular positions to a second of said predetermined angular positions.

Thus the torque applied to the driven disk is higher when the disk starts to be driven in rotation, which can be advantageous, especially if the apparatus to be controlled opposes a relatively high resisting torque at the beginning of the change from a certain mode of operation corresponding to said first angular position to another mode corresponding to said second angular position. This occurs, for example, on separating the movable contact and the fixed contact of a high-voltage electrical disconnector, to go from a closed mode of operation to an open mode of operation.

Said rotary member preferably includes a plurality of indexing means arranged around its axis, and each of said disks then preferably includes a plurality of slots in a portion of the circumference thereof The number of slots in the driving disk is one less than the number of predetermined positions of the coupling means, with the result that one slot in the driving disk corresponds to each movement between two predetermined positions.

The slots in the driven disk preferably include two shallow end slots and deep intermediate slots. The number of said intermediate slots is identical to the number of slots in the driving disk.

As becomes more clearly apparent below, said intermediate slots are intended for drive of the driven disk by the driving disk but also for locking the driven disk in angular positions that correspond to the predetermined angular positions of the coupling means, whereas said end slots contribute only to locking the driven disk.

Said slots are preferably regularly distributed over said portion of the circumference of each of the disks.

Alternatively, if the predetermined angular positions of the coupling means are not defined with a regular angular interval, the slots can be distributed in an appropriate irregular manner.

Two consecutive indexing means of the rotary member are advantageously partially engaged in respective adjacent slots in the driven disk to lock it against rotation when said coupling means are in one of said predetermined angular positions.

These indexing means therefore enable the driven disk, and thus the coupling means, to be locked in their predetermined angular positions by bringing about mutual immobilization of the driven disk and of the rotary member.

Said two disks and said rotary member are preferably such that said two consecutive indexing means are pressed against the peripheral edge of the driving disk when the coupling means are in one of said predetermined angular positions.

In said locking mode, the fact that the two consecutive indexing means, which are partially engaged in two slots in the driven disk, bear against the edge of the driving disk enables immobilization against rotation of said rotary member, and thus also of the driven disk and the coupling means.

The respective points of contact of said two consecutive indexing means with the flanks of the above-mentioned adjacent slots of the driven disk are advantageously in planes respectively passing through the axis of the rotary member and through respective axes of said two consecutive indexing means when the coupling means are in one of said predetermined angular positions, with the result that rotation of the rotary member simultaneously causes engagement of one of said indexing means in one of said slots and disengagement of the other indexing means from the other slot.

Thus, starting from a state for locking said coupling means in one of their predetermined angular positions, when a slot in the driving disk is in an angular position such that its mouth coincides with the mouth of said slot in the driven disk in which said indexing means are engaged, a small rotary movement of the rotary member is sufficient to enter into said drive mode so as to drive said coupling means in rotation to another angular position.

The peripheral edge of the driving disk advantageously has teeth, one of which exerts radially outward pressure on one of said two consecutive indexing means to cause the rotary member to rotate in the event of a command to modify the mode of operation of said apparatus to be controlled.

Such rotation disengages said indexing means from a slot in the driven disk conjointly with engagement of the other of said indexing means in respective slots in the two disks.

Said teeth preferably have curved flanks against which the indexing means can slide or roll to enable a progressive change from said locking mode to said drive mode.

Generally speaking, said teeth form means for controlling the angular position of the rotary member.

The driving disk advantageously includes a disk portion having a radius greater than the radius R1 of this driving disk, and the peripheral edge thereof has ends connected to portions of the edge of the driving disk of radius R1 by radial rims that can be pressed against one of said consecutive indexing means to limit the rotation of the driving disk when the coupling means are in an extreme position that is one of said predetermined angular positions.

These radial rims therefore form limit stops for the driving disk in the event of delayed stopping of the motor unit of the device.

Said rotary member preferably includes two identical superposed triangular plates that are mounted on a shaft referred to below as the auxiliary shaft, with respective vertices that are connected in pairs by rivets and that carry circular section cylindrical rollers that are mounted on these rivets to rotate thereon and that form said indexing means.

Said circular section cylindrical rollers have the advantage that they can roll both in contact with the edge of the driving disk and in contact with the flanks of said slots in both disks.

The structure with two superposed plates imparts good stiffness to the rotary member and ensures retention of the rollers on their respective rivets.

The control device preferably includes means for limiting the torque transmitted by the motor unit to the driving disk, said means being disposed between the motor unit and the driving disk on an axis separate from said axis of the disks.

Because of the limited amplitude of the variations in the transmission ratio between the driving disk and the driven disk, it is possible to integrate torque limiter means at any point in the system transmitting power from the motor unit to the driving disk. It is therefore possible in particular to provide these means on an axis located in the vicinity of the motor unit, where the torque is relatively low, so as to be able to use torque limiter means that are of relatively low mass, of relatively small overall size, and of relatively low cost to manufacture.

The motor unit advantageously includes an electric motor having its axis of rotation parallel to a chassis plate of the device and that drives angular gears having one axis parallel to the axis of the motor and their other axis perpendicular to the chassis plate and parallel to the axis of the disks.

This configuration makes the device particularly compact.

Alternatively, the axis of rotation of the motor can be parallel to the axis of the disks, if this is of practical benefit.

Furthermore, the control device preferably includes indicator means for indicating the angular position of said coupling means to means for controlling said motor unit.

These indicator means enable automatic stopping of the motor unit at the end of an operation of changing the angular position of the coupling means, after the coupling means have reached a required angular position.

The coupling means are advantageously formed at one end of a transmission shaft that carries the driven disk and on which the driving disk is mounted to rotate freely.

This configuration provides a simple and reliable mechanical connection between the driven disk and the coupling means.

The control device then advantageously includes a driving toothed wheel fastened to the driving disk and mounted on the transmission shaft to rotate freely thereon.

This toothed wheel therefore transmits power from the motor unit to the driving disk.

Said coupling means are advantageously adapted to be coupled to a high-voltage or medium-voltage electrical disconnector, for example a disconnector with three switching positions.

The device of the invention is particularly appropriate for controlling electrical switchgear of this type because of its high reliability and small overall size.

However, the invention is not limited to controlling such disconnectors, and the device of the invention can advantageously be employed to control any type of apparatus having a coupling element movable in rotation in a discrete series of angular positions.

BRIEF DESCRIPTION OF THE DRAWINGS

The invention can be understood better, and its other details, advantages, and features become apparent, on reading the following description given by way of non-limiting example and with reference to the appended drawings, in which.

DETAILED DESCRIPTION OF PREFERRED EMBODIMENTS

Figure 1:
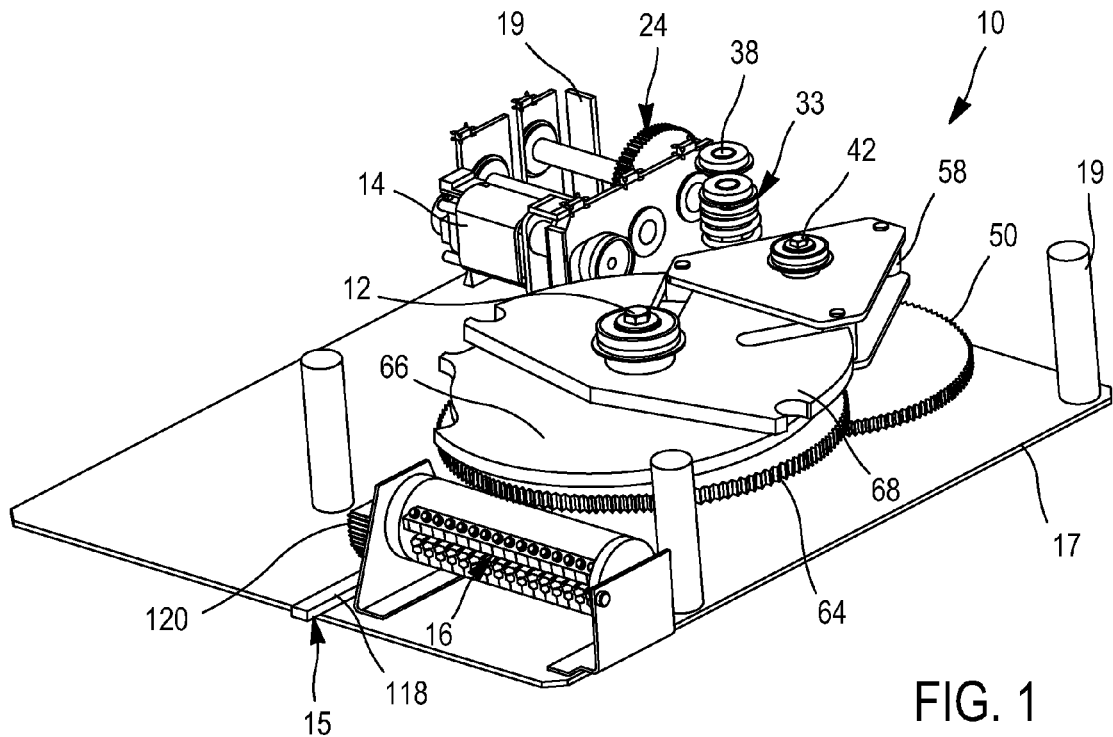
FIG. 1 is a diagrammatic perspective view of a control device according to a first preferred embodiment of the invention.

FIG. 1 represents a mechanical device 10 for controlling a disconnector (not shown) with three switching positions for high-voltage or medium-voltage circuits.

The device 10 includes a transmission shaft 12 adapted to be coupled to the movable contact of a disconnector of the above-mentioned type, an electric motor 14, means for transmitting power from said electric motor 14 to said transmission shaft 12, means 15 for indicating the angular position of said transmission shaft 12 to auxiliary switches 16, in particular for controlling the electric motor and for signaling said angular position of the transmission shaft 12, and a chassis plate 17 on which the main components of the device are mounted.

The device 10 further includes a top chassis plate, which is not shown in the figures in order to expose the internal components of the device. This top plate is fixed to uprights 19 connected to the chassis plate 17 and contributes to supporting certain components of the device, as becomes more clearly apparent below.

Figure 2:
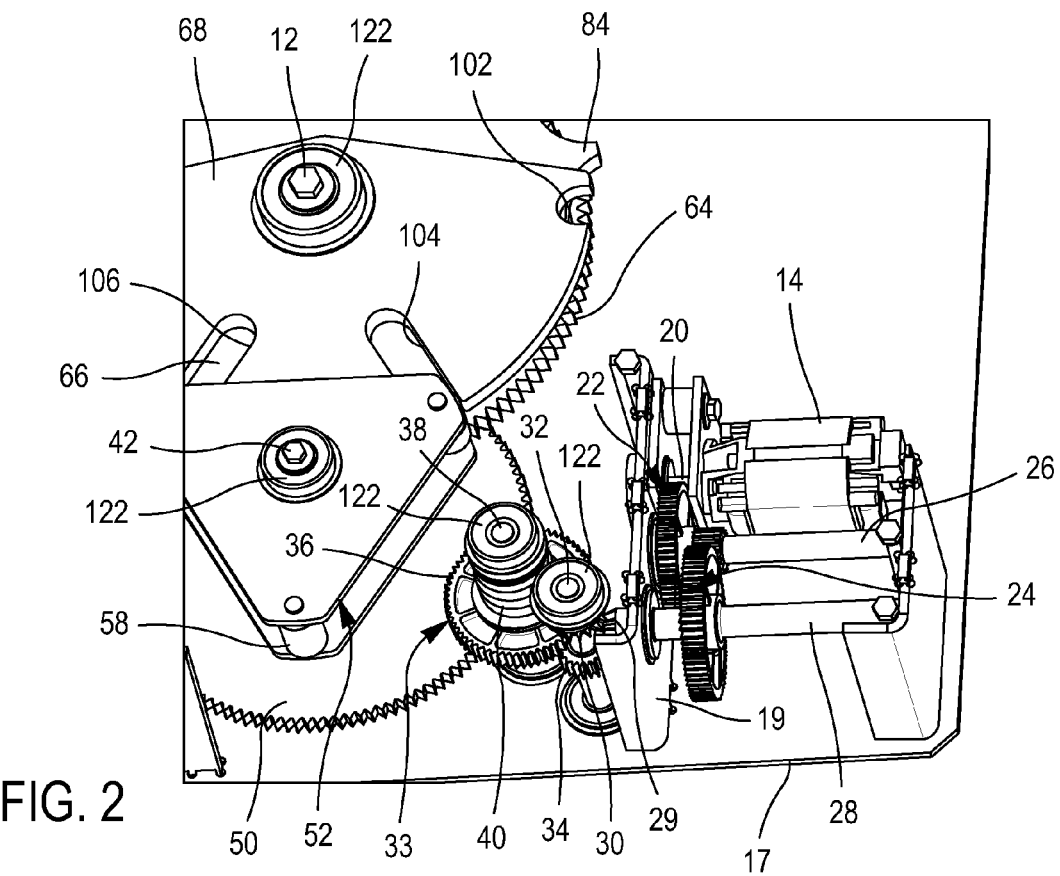
FIG. 2 is a diagrammatic perspective view, substantially from above, of a portion of the device from FIG. 1.

FIG. 2 shows that the electric motor 14 has a rotary output shaft 20 and said motor is fixed to the chassis plate 17 so that its rotary shaft 20 is parallel to the chassis plate.

The rotary shaft 20 of the electric motor 14 carries a pinion (hidden in FIG. 2) meshing with a reduction gear 22 in turn meshing with another reduction gear 24, these two reduction gears being carried by respective rotary shafts 26 and 28 parallel to the rotary shaft 20 of the electric motor 14.

The reduction gear 24 includes a bevel pinion 29 that is carried by one end of said shaft 28 and meshes with a bevel pinion 30. This bevel pinion 30 is fixed to the upper end of a shaft 32 that is mounted on the chassis plate 17 to rotate thereon and that is perpendicular thereto and therefore to said shaft 28.

The bevel pinions 29 and 30 form angular gears enabling the rotary movement of said electrical motor 14 about an axis parallel to the chassis plate 17 to be transmitted to torque limiter means 33 having an axis of rotation perpendicular to said plate 17.

To this end, the shaft 32 carries a pinion 34 that meshes with a toothed wheel 36 mounted on a shaft 38 parallel to said shaft 32 to rotate thereon. Said shaft 38 carries a reduction pinion (hidden in FIG. 2). In the example represented in FIG. 2, the reduction pinion on the shaft 38 is between the lower end of that shaft, which is mounted on the chassis plate 17, and the toothed wheel 36 on said shaft.

The shaft 38 carries said torque limiter means 33, which limit the torque transmitted by the toothed wheel 36 to the reduction pinion on this shaft 38.

Figure 5:
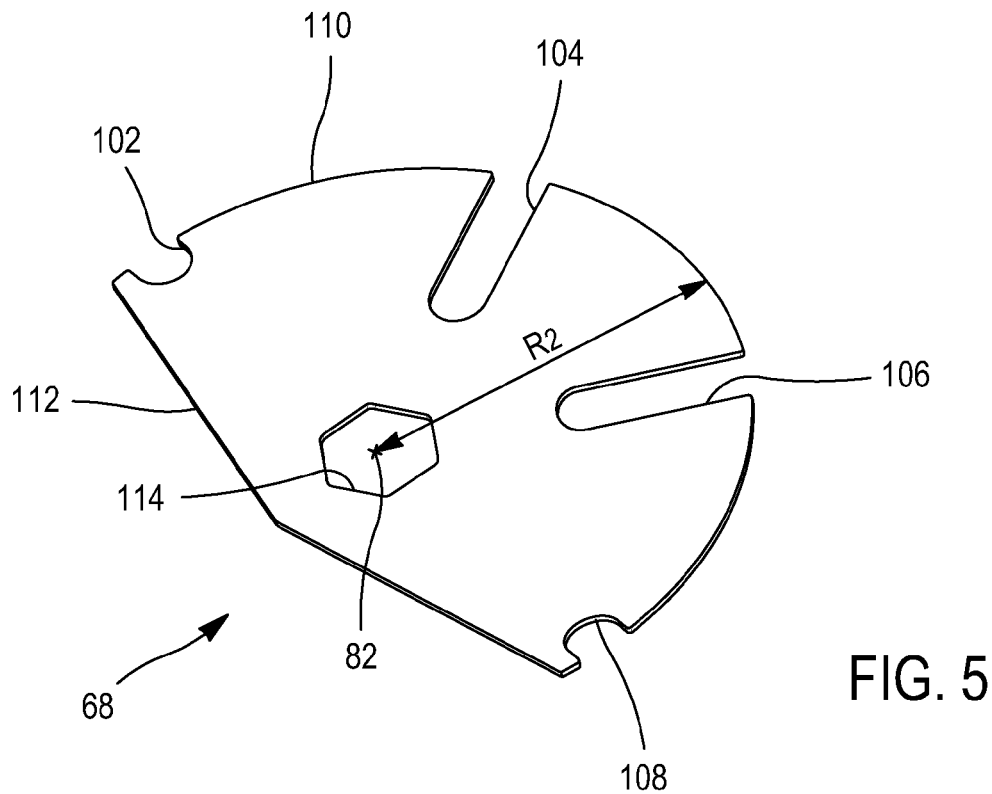
FIG. 5 is a diagrammatic perspective view of a driven disk of the device from FIG. 1.

The torque limiter means 33 can be of a known type, and for example include balls disposed between respective facing flanks of the toothed wheel 36 and the reduction pinion, cups formed in the respective surfaces of these flanks to accommodate said balls partially, and a coil spring 40 that applies an axial pressure to the toothed wheel 36 in the direction of the reduction pinion to retain said balls in said cups, thus forming a disengageable transmission mechanism that is sometimes referred to as a "ball torque limiter" and one example of which is shown in FIG. 5 of the above-mentioned prior art document EP 1 659 601.

The device 10 further includes an auxiliary shaft 42 that is mounted on the chassis plate 17 and that extends along an axis 43 perpendicular thereto.

Figure 3:
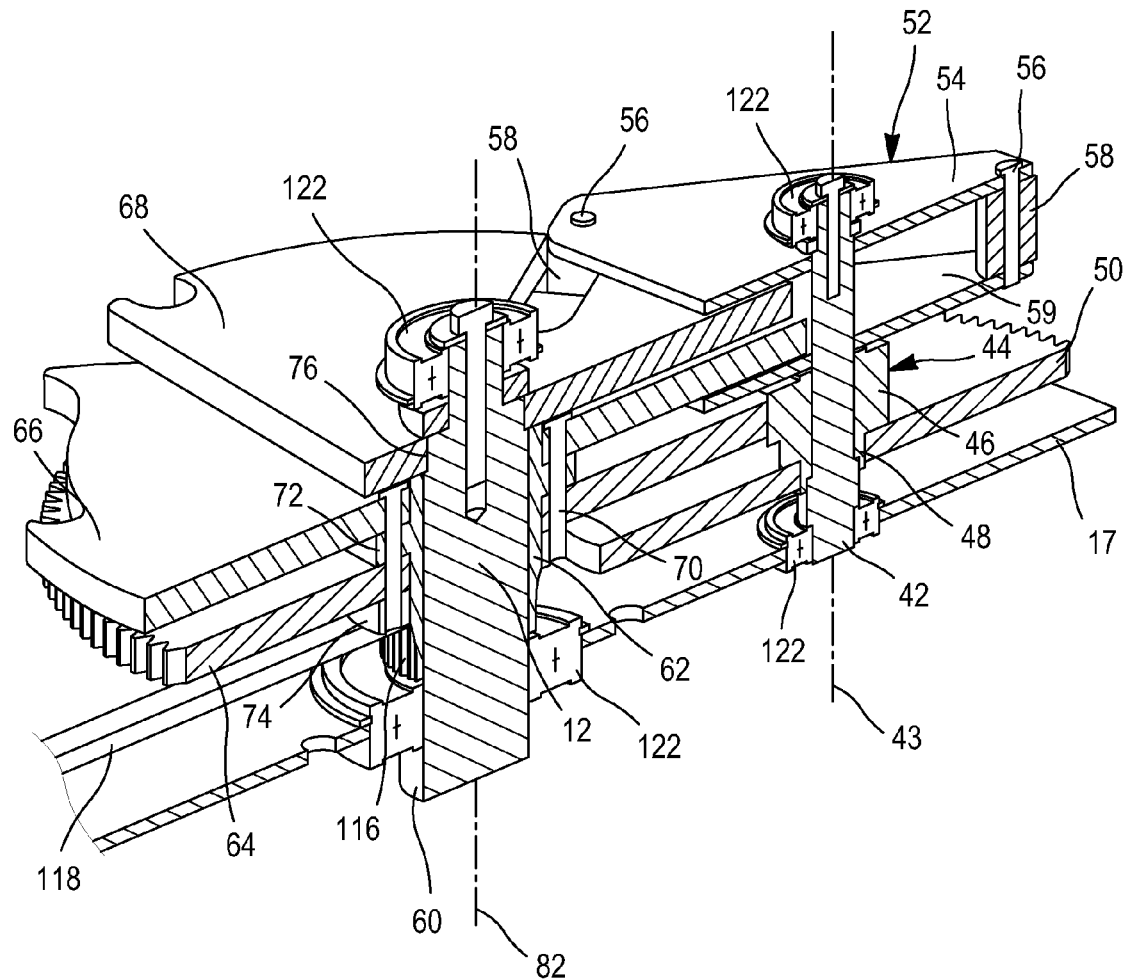
FIG. 3 is a perspective view to a larger scale of a portion of FIG. 1 with a section plane passing through the respective rotation axes of a transmission shaft and an auxiliary shaft of the device.

As can be seen more clearly in FIG. 3, the auxiliary shaft 42 carries a sleeve 44 that is mounted on the shaft 42 to rotate freely thereon and that has a toothed upper portion 46 and a lower portion 48 with an external surface that has a polygonal section that is for example hexagonal.

A toothed wheel 50 is fitted around the lower portion 48 of the sleeve 44 and meshes with the reduction pinion on the shaft 38. This toothed wheel 50 includes a central orifice whose section is conjugate with that of the lower portion 48 of the sleeve 44. This arrangement constrains the toothed upper portion 46 of the sleeve 44 and the toothed wheel 50 to rotate together.

The device 10 further includes a rotary member 52 mounted on the auxiliary shaft 42 to rotate freely thereon so that it can rotate freely relative to the sleeve 44 carried by the same auxiliary shaft.

The rotary member 52 includes a first plate 54 of substantially equilateral triangle shape, including a central orifice for mounting it on the auxiliary shaft 42. Each vertex of said first plate 54 has substantially passing through it one end of a rivet 56 perpendicular to the plane of the plate. Each rivet 56 carries a cylindrical roller 58 mounted on said rivet to rotate thereon and has its other end fixed to a vertex of a second plate 59 identical to said first plate 54 to retain the rotary rollers 58 axially.

The transmission shaft 12 is parallel to the auxiliary shaft 42 and has a lower end that is mounted in the chassis plate 17 and includes a projecting portion 60 forming coupling means adapted to enable coupling of the transmission shaft 12 with a disconnector to be controlled (not visible in the figures).

A sleeve 62 is mounted on the transmission shaft 12 to rotate freely thereon. A driving toothed wheel 64 and a driving disk 66 are fixedly mounted around the sleeve 62 and a driven disk 68 is mounted on the upper end of the transmission shaft 12 so that the driving toothed wheel 64 and the two disks 66 and 68 are coaxial.

The driving toothed wheel 64 and the driving disk 66 are fixed to the sleeve 62 by rivets 70, for example, each passing through two aligned orifices respectively formed in an annular shoulder 72 on the sleeve 62 and in a ring 74 mounted around the sleeve 62. As can be seen in FIG. 3, the shoulder 72 is between the lower flank of the driving disk 66 and the upper flank of the driving toothed wheel 64, and the ring 74 is held against the lower flank of said toothed wheel 64 by said rivets 70.

The driven disk 68 includes a polygonal, for example hexagonal, section central orifice through which passes a portion 76 of the transmission shaft 12 having a section whose shape is conjugate with that of the orifice in the driven disk 68, so that the driven disk 68 and the transmission shaft 12 are constrained to rotate together.

Figure 4:
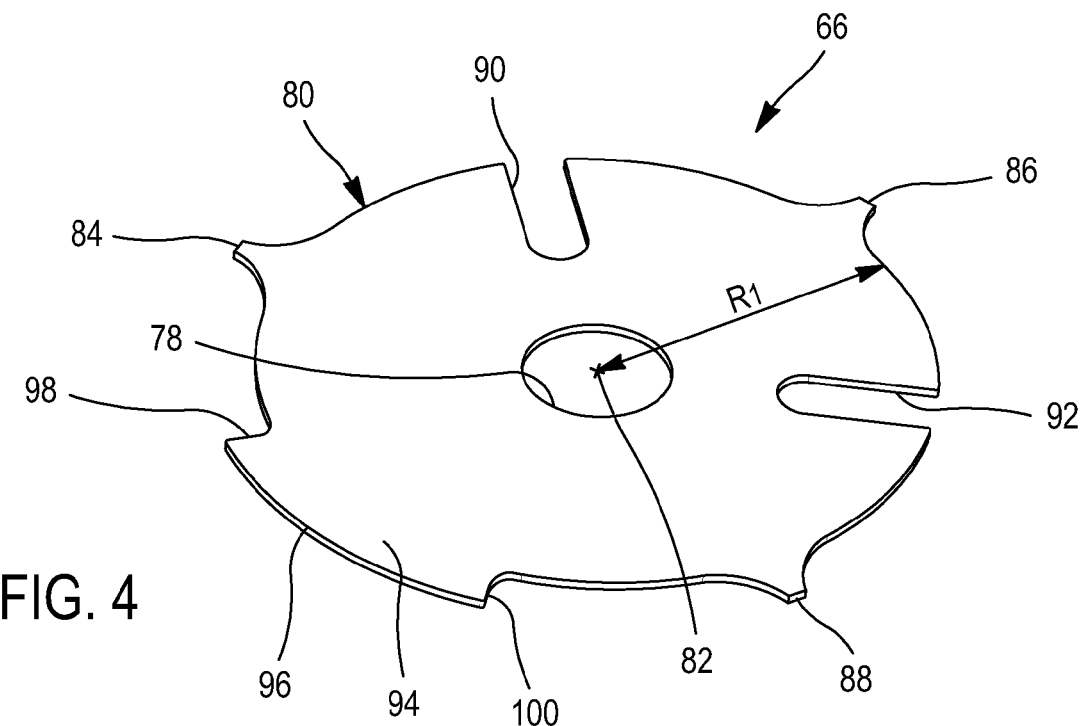
FIG. 4 is a diagrammatic perspective view of a driving disk of the device from FIG. 1.

FIG. 4 shows that the driving disk 66 includes a circular section central orifice 78 for mounting it around the sleeve 62.

This driving disk 66 has a globally circular peripheral edge 80 of radius R1 centered on the axis 82 of said disk. This peripheral edge 80 includes three teeth 84, 86 and 88 regularly distributed around its circumference and showing curved flanks The driving disk 66 further includes two radial slots 90 and 92 with a U-shaped profile cut into the peripheral edge 80 of the disk, said slots being respectively formed half-way between the teeth 84 and 86 and half-way between the teeth 86 and 88. The internal width of the slots 90 and 92 is slightly greater than the diameter of the section of the rollers 58 to enable the rollers 58 to engage in these slots.

The slots 90 and 92 are positioned relative to the tooth 86 so that, when the driving disk 66 is in an angular position in which one of the slots 90 or 92 is facing a first roller 58 of the rotary member 52, the flank of the tooth 86 on the side of the tooth opposite the above-mentioned slot is in contact with a second roller 58 of the rotary member 52. This situation is explained in more detail in the following description with reference to FIG. 8, in which the above-mentioned two rollers are respectively designated 58a and 58b.

The bottom of the slots 90 and 92 is at a radial distance from the peripheral edge 80 of the driving disk 66 that is sufficient for a roller 58 of the rotary member 52 to be able to travel along the flank of one or the other of the slots 90 and 92 during a rotation of the rotary member 52 without being blocked by the bottom of said slot.

The driving disk 66 also includes a disk portion 94 having a radius greater than the radius R1 and having a peripheral edge 96 the two ends of which are connected to the peripheral edge 80 of the disk 66 by respective radial rims 98 and 100 that form limit stops for said driving disk 66.

FIG. 5 shows that the driven disk 68 includes four radial slots 102, 104, 106 and 108 cut at regular intervals into a circular arc-shaped portion 110 of the external edge of this disk. This circular arc-shaped portion 110 subtends an angle of slightly more than 180°.

In the example shown, a portion of the driven disk 68 that is of no utility has been cut away to lighten the device. This is why the edge of the driven disk 68 includes a substantially rectilinear part 112 that connects the ends of the circular arc-shaped portion 110.

The radius R2 of the circular arc-shaped portion 110 of the external edge of the driven disk 68 is substantially equal to the sum of the radius R1 of the driving disk 66 and the radius of the section of the rollers 58.

The slots in the driven disk 68 include two end slots 102 and 108 of semicircular shape having a radius substantially equal to the radius of the section of the cylindrical rollers 68 and two intermediate slots 104 and 106 with a U-shaped profile.

The angular distance between the slots in the driven disk 68 depends on the angle of rotation of the transmission shaft 12 between two consecutive predetermined positions. In the example shown, that angle is 60°, with the result that the end slots 102 and 108 are diagonally opposite each other.

The bottom of the intermediate slots 104 and 106 is at a radial distance from the circular arc-shaped portion 110 of the external edge of the driven disk 68 that is sufficient for a roller 58 of the rotary member 52 to be able to travel on the flank of one or the other of said intermediate slots 104 and 106 during a rotation of the rotary member 52 without being blocked by the bottom of said slot.

The distance between the transmission shaft 12 and the auxiliary shaft 42, the distance between the respective axes of the rotary member 52 and its rollers 58, and the angle at the center of the median radial planes of the intermediate slots 104 and 106 of the driven disk 68 are such that two consecutive rollers 58 of the rotary member 52 can simultaneously bear against the peripheral edge 80 of the driving disk 66, while being partly entering two consecutive slots in the driven disk 68, for example the intermediate slots 104 and 106.

Figure 6:
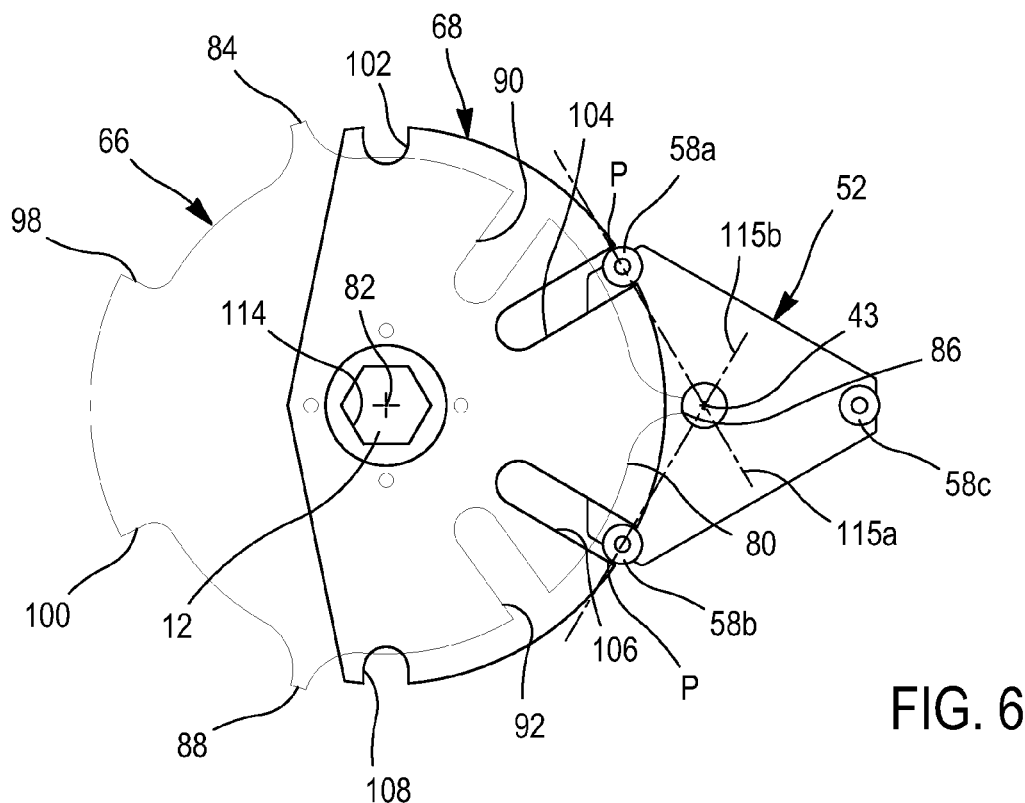
FIGS. 6 to 10 are partial diagrammatic plan views of the device from FIG. 1, showing the two disks and the rotary member of the device at various stages of the operation of the device.

In this position, the point P of contact between the flank of the slot 104, respectively 106, and the roller 58*a*, respectively 58*b*, the axis of this roller 58*a*, respectively 58*b*, and the axis 43 of the rotary member 52 are in a common plane 115*a*, respectively 115*b*, as shown in FIG. 6.

As becomes more clearly apparent in the following explanation of the operation of the device 10, this feature facilitates total engagement of one of the above-mentioned two rollers 58 in the corresponding slot in the driven disk 68 simultaneously with the disengagement of the other of the above-mentioned rollers 58 from the other of the above-mentioned slots in the driven disk 68.

Moreover, the sleeve 62 of the transmission shaft 12 has a toothed lower portion 116 (FIG. 3) meshing with a rack 118 also meshing with a toothed wheel 120 (FIG. 1) connected to the switches 16 controlling the power supply of the electric motor 14 and signaling the position of the transmission shaft 12 and consequently the position of the contacts of the disconnector controlled by this device.

The toothed lower portion 116 of the sleeve 62 and the rack 118 thus form the means 15 for indicating the angular position of the transmission shaft 12 to the switches 16 for controlling the electric motor.

The various shafts of the device 10 can be mounted in their respective supports, such as the plate 17, the top chassis plate and the uprights 19, by any appropriate means, for example ball bearings 122 (FIG. 3).

FIGS. 6 to 10 illustrate the operation of the control device described above and more particularly represent the two disks 66 and 68 and the rotary member 52 which are adapted to drive the transmission shaft 12 of this device.

FIG. 6 represents the device 10 in a state in which the electric motor 14 is stopped and the transmission shaft 12 is in a median position, corresponding to operation in the open mode of the disconnector coupled to this transmission shaft 12.

In this position, two rollers 58*a* and 58*b* rest on the peripheral edge 80 of the driving disk 66, one on each side of the tooth 86, which prevents rotation of the rotary member 52. These rollers 58*a* and 58*b* are respectively partly engaged in the intermediate slots 104 and 106 of the driven disk 68, with the result that the driven disk is also prevented from rotating.

Figure 7:
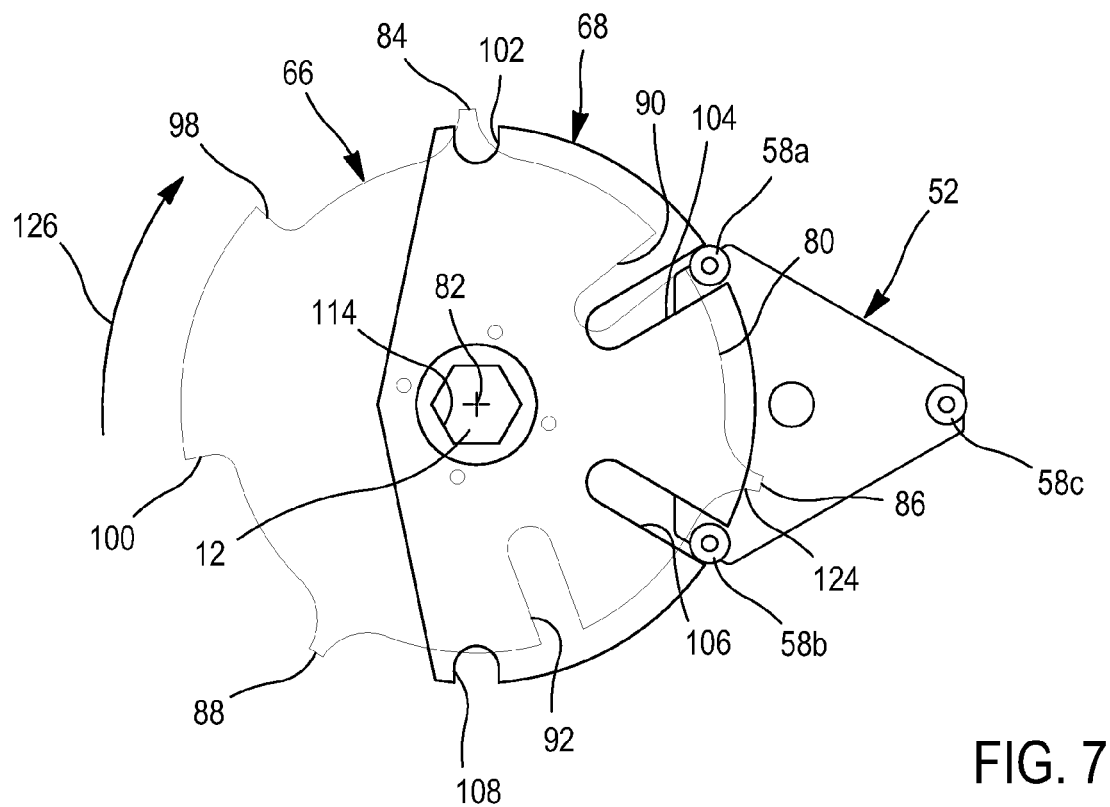

FIG. 7 shows the device 10 shortly after the start of an operation to change the mode of operation of the disconnector, for example to the closed mode.

During this operation, the electric motor is first started manually by an operator or by the control system in a first rotation direction to cause the driving disk 66 to rotate in the clockwise direction, this rotation being symbolized by the arrow 126 in FIG. 7.

To this end, the rotation of the shaft 20 of the electric motor 14 is transmitted successively to the reduction gears 22 and 24, the bevel pinions 29, 30, the pinion 34, the toothed wheel 36, the torque limiter 33, the wheel 50, the toothed upper portion 46 of the sleeve 44 and the driving wheel 64 fastened to the driving disk 66.

The driven disk 68 continues to be prevented from rotating by the rollers 58*a* and 58*b*, which roll against the peripheral edge 80 of the driving disk 66, which is rotating at this time, until the roller 58*b* comes to bear against a curved flank 124 of the tooth 86 on the driving disk 66.

Figure 8:
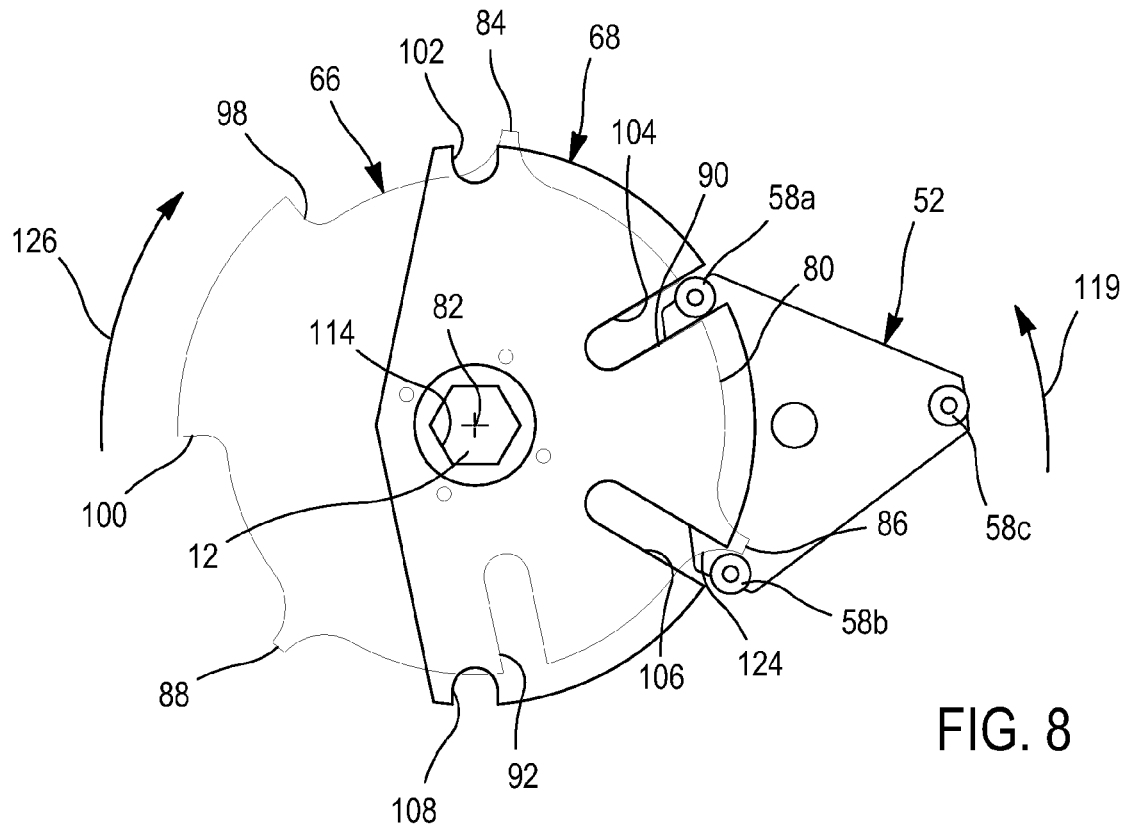

As shown in FIG. 8, the slot 90 in the driving disk 66 is then superposed on the slot 104 in the driven disk 68, in which the roller 58*a* is already engaged, with the result that the roller 58*b* can follow the curve of the flank 124 of the tooth 86 and thus cause the rotary member 52 to rotate in the opposite direction to the driving disk 66 (arrow 119), simultaneously causing engagement of the roller 58*a* in the slot 90 in the driving disk 66 and disengagement of the roller 58*b* from the slot 106 in the driven disk 68.

Figure 9:
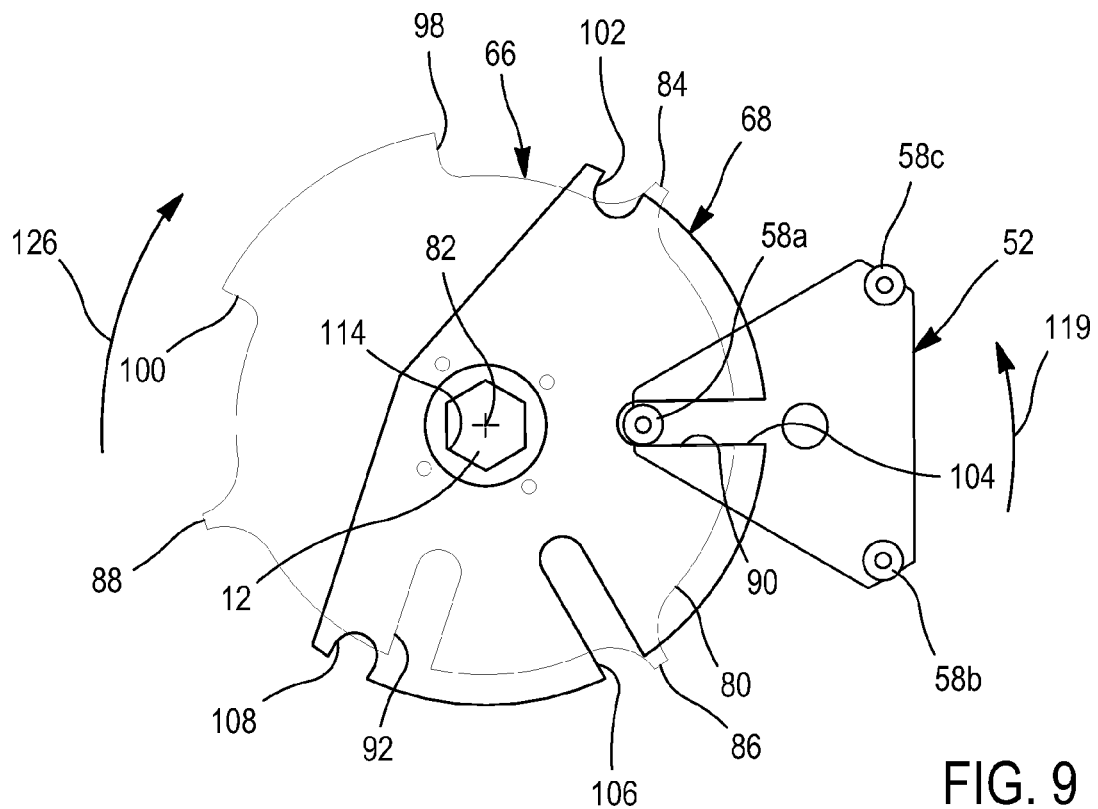

The roller 58*a*, which is simultaneously engaged in the respective slots 90 and 104 in the driving disk 66 and the driven disk 68, then constrains these two disks to rotate together, with the result that the driven disk 68 and the transmission shaft 12 turn together with the driving disk 66, which continues to be driven by the electric motor 14, as shown in FIG. 9.

The two disks 66 and 68 turn at the same speed, with the result that the transmission ratio between the electric motor 14 and the transmission shaft 12 is constant.

During the conjoint rotation of the two disks 66 and 68, the roller 58*a* drives the rotary member 52 in rotation and effects a to-and-fro movement in the slots 90 and 104, rolling against the flanks of those slots.

Figure 10:
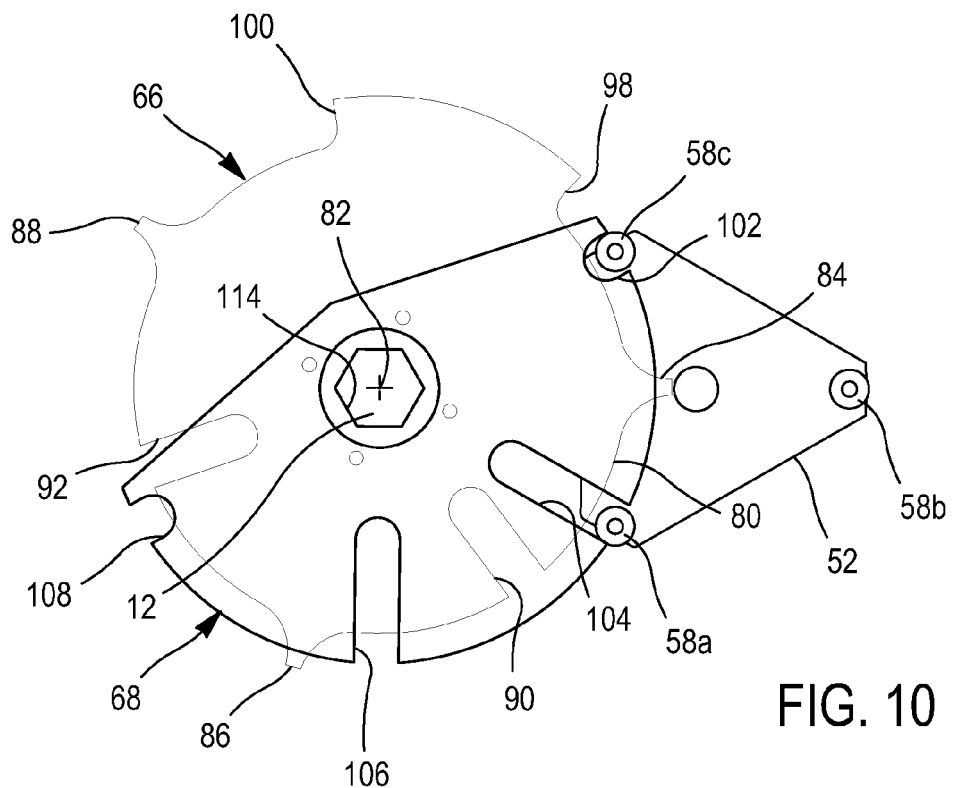

When the roller 58*a* is disengaged from the slot 90 in the driving disk 66, the rotary member 52 ceases to be driven in rotation by the driving disk 66 and the third roller 58*c* is partially engaged in the end slot 102 of the driven disk 68, as shown in FIG. 10.

The roller 58*a* remains partially engaged in the slot 104 in the driven disk 68, resting against the peripheral edge 80 of the driving disk 66, with the result that the rotary member 52 and the driven disk 68 are prevented from rotating.

The transmission shaft 12 is then in a predetermined position corresponding to the closed mode of the disconnector to which the shaft is coupled.

The driving disk 66 can continue to rotate until the control switches 16 stop the electric motor 14 following movement of the rack 118 for indicating the angular position of the transmission shaft 12.

In a similar manner, the disconnector goes from the closed mode to the open mode in accordance with a moving sequence that is the reverse of that described above.

This switching operation requires starting the electric motor 14 in a second rotation direction, the opposite of the first rotation direction of the motor 14, to enable the driving disk 66 to be driven in the opposite direction to the arrow 126 in FIG. 7. The rotation of the driving disk 66 then brings a flank of the tooth 84 on this driving disk to bear against the roller 58*c* of the rotary member 52 to disengage this roller 58*c* from the end slot 102 in the driven disk 68 and simultaneously to engage the roller 58*a* in the respective slots 90 and 104 in the driving disk 66 and the driven disk 68.

The roller 58a then enables the driven disk 68 to be driven by the driving disk 66 with a constant transmission ratio until this roller 58a is disengaged from the slot 90 in the driving disk 66.

The roller 58b of the rotary member 52 is engaged in the slot 106 at this time, with the result that the driven disk 68 is immobilized, as in FIG. 6, slightly before the electric motor 14 is stopped.

The disconnector is switched between its open and grounding modes in a similar manner to that described above. The driven disk 68 and the driving disk 66 are locked together in this situation by the roller 58b of the rotary member 52 and in the grounding mode the driven disk 68 is immobilized by the engagement of the rollers 58b and 58c in the respective slots 106 and 108 in the driven disk 68.

The direction of rotation of the motor 14 and the driving disk 66 to go from the open mode to the grounding mode is the opposite of that symbolized by the arrow 126 in FIG. 7.

During operation of the control device 10, the torque limiter means 33 transmit power from the electric motor 14 to the toothed wheel 50.

However, if any of the rotary elements of the device or of the disconnector controlled by the device is accidentally jammed, this jamming propagates to the reduction pinion carried by the shaft 38, with the result that the pressure exerted by the spring 40 is no longer sufficient to hold the balls engaged in the respective cups of this pinion and the toothed wheel 36. As soon as this situation arises, the toothed wheel 36 is no longer constrained to rotate with the gear on the shaft 38 and can turn freely without driving the gear in rotation.

The torque limiter means 33 therefore minimize the forces transmitted to the rotary members of the device in the event of accidental jamming and therefore reduce the risk of damage to the device and the disconnector coupled to the device.

In particular, these torque limiter means 33 protect against failure of the means 15 for indicating the position of the transmission shaft 12 or the control switches 16 of the electric motor 14, which would have the consequence of driving the driving disk 66 beyond its normal travel, until one of the radial rims 98 or 100 of this disk abutted against the cylindrical surface of one of the rollers 58 of the rotary member 52 and caused disengagement of the torque limiter means 33.

In the event of accidental jamming of the contacts of the disconnector coupled to the control device 10, the arrangement of the torque limiter means 33 on an axis separate form said axis 82 of said coupling means 60 enables the auxiliary switches 16 to ensure correct signaling of the position of these contacts.

Figure 11:
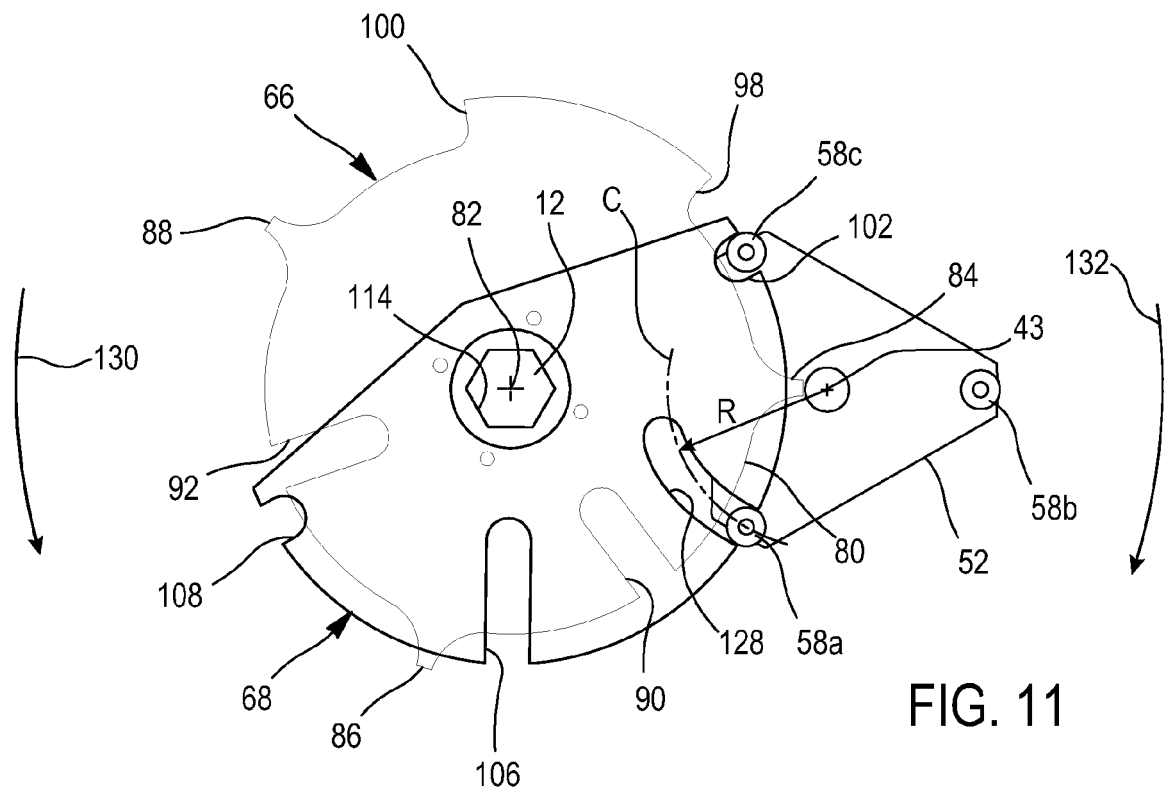
FIG. 11 is a view similar to FIG. 10, representing a device according to a second preferred embodiment of the invention.

FIG. 11 represents a device conforming to another embodiment of the invention.

In this FIG. 11, elements of this device that are identical to elements of the device described above are designated by the same references as those elements.

This device differs from the device described above in that a curved profile slot 128 replaces the radial slot 104 in the driven disk 68.

The curvature of this slot 128 is such that the bottom of this slot 128 is close to the slot 102 in the driven disk 68.

The median radius of curvature of the profile of the slot 128 is greater than the radius R of the circle C centered on the axis 43 of the rotary member 52 on which the rollers 58 are disposed.

From the position represented in FIG. 11, which corresponds to the closed mode of operation of the disconnector coupled to the transmission shaft 12, when the driving disk 66 is driven in rotation by the motor 14 in the direction symbolized by the arrow 130 (FIG. 11) to drive the rotary member 52 in rotation in the direction symbolized by the arrow 132, the roller 58a of the rotary member 52 is conjointly engaged in the radial slot 90 in the driving disk 66 and in the curved slot 128 in the driven disk 68, and moves toward the bottom of these slots along their respective flanks, in a similar manner to that described above.

Because of the curvature of the slot 128, the driven disk 68 at first rotates at a speed lower than that of the driving disk 66, with the result that the transmission ratio between the two disks is at that time less than 1.

When the roller 58a has reached a median position during its rotation, its direction of movement relative to the slots is reversed, with the result that this roller 58a begins to move along the flanks of the slots 90 and 128 in the radial direction toward the outside of those slots.

Because of the curvature of the slot 128, the driven disk 68 then turns at a higher speed than the driving disk 66, with the result that the transmission ratio between the two disks at this time is greater than 1.

In this configuration, the transmission ratio therefore evolves along a curve during the rotation of the driven disk 68, which causes it to be at first less than 1 and then greater than 1. The curvature of the slot 128 thus increases the torque applied to the driven disk 68 by the roller 58a when the driven disk 68 starts to be driven in rotation, as the disconnector goes from the closed mode to the open mode.

This is of benefit in that the change from the closed mode to the open mode requires separating two contacts of the disconnector, which generally requires a relatively high force.

As mentioned above, the invention is not limited to the devices described above with reference to the appended drawings.

For example, a control device of the invention can have more than three operating positions, so the number of slots in the driving disk 66 and the driven disk 68 is greater than in the examples described above.

The slots in the disks 66, 68 can furthermore be distributed in an irregular manner around the axis 82 of the disks, which requires the rollers 58 of the rotary member 52 to be correspondingly arranged around the axis 43 of the rotary member. This can be beneficial when the angular positions corresponding to the various modes of operation of the disconnector coupled to the device are not separated by equal angles.

Moreover, the rotary member 52 can have different shapes without departing from the scope of the invention. For example, to increase the number of rollers 58 relative to the example described above, the plates 54 and 59 of this rotary member 52 can have the shape of a regular polygon having more than three vertices.

To reduce the manufacturing cost of the rotary member 52, its plates 54 and 59 can also have the shape of disks and the rollers 58 can be arranged on the circumference of these disks.

These rollers 58 can moreover have various shapes, for example cylinders of non-circular section. It is then highly preferable for the rollers to have a contact surface that is sufficiently slippery to enable them to move in the slots in the disks 66 and 68 with minimum friction.

Moreover, the axis of the motor 14 could be parallel to the respective axes 43 and 82 of the rotary member 52 and the transmission shaft 12.

Moreover, the coupling means 60 could be on a shaft separate from the shaft of the driving disk 66 and the driven disk

68 and mechanically connected to the driven disk 68, for example by gears, so as to be constrained to rotate with the driven disk 68.

The invention claimed is:

1. A control device, including coupling means adapted to be coupled to an apparatus to be controlled, said coupling means being rotatably movable and being lockable in predetermined angular positions corresponding to different operating states of said apparatus to be controlled, said device comprising a driving disk driven in rotation about an axis by a motor unit, a driven disk mounted to rotate about said axis and constrained to rotate with said coupling means, and means for switching between a drive mode for driving said coupling means in rotation, in which said driving disk is mechanically connected to said driven disk so that said driving disk can drive said driven disk in rotation, and a locking mode for locking the angular position of said coupling means, in which said two disks are freely rotatable relative to each other, said switching means comprising a rotary member that is mounted to rotate about an axis parallel to said axis of said disks, the device being characterized in that said rotary member carries at least one indexing means which, due to rotation of said rotary member, can be simultaneously engaged into two slots respectively formed in the peripheral edges of said two disks so as to induce a commutation into said drive mode, and can be disengaged from at least one of said slots so as to induce a commutation into said locking mode.

2. A control device according to claim 1, characterized in that said slots in said two disks extend radially with the result that said two disks are constrained to rotate together in said drive mode.

3. A control device according to claim 1, characterized in that at least one of said slots in said driving disk and/or said driven disk has a curved profile with the result that the transmission ratio between said two disks is less than 1 when switching from said locking mode to said drive mode in order to drive the coupling means from a first of said predetermined angular positions to a second of said predetermined angular positions.

4. A control device according to claim 1, characterized in that said rotary member includes a plurality of indexing means arranged around its axis.

5. A control device according to claim 4, characterized in that each of said disks includes a plurality of slots in a portion of the circumference of the disk.

6. A control device according to claim 5, characterized in that two consecutive indexing means of said rotary member are partially engaged in respective adjacent slots in said driven disk to lock it against rotation when said coupling means are in one of said predetermined angular positions.

7. A control device according to claim 6, characterized in that said disks and said rotary member are such that said two consecutive indexing means are pressed against the peripheral edge of said driving disk when said coupling means are in one of said predetermined angular positions.

8. A control device according to claim 6, characterized in that the respective points (P) of contact of said two consecutive indexing means with the flanks of said adjacent slots of said driven disk are in planes respectively passing through the axis of said rotary member and through respective axes of said two consecutive indexing means when the coupling means are in one of said predetermined angular positions, with the result that rotation of said rotary member simultaneously causes engagement of one of said two consecutive indexing means into one of said slots and disengagement of the other indexing means from the other slot.

9. A control device according to claim 6, characterized in that said peripheral edge of said driving disk has teeth, one of which exerts radially outward pressure on one of said two consecutive indexing means to cause said rotary member to rotate in the event of a command to modify the mode of operation of the apparatus to be controlled.

10. A control device according to claim 6, characterized in that said driving disk includes a disk portion having a radius greater than the radius (R1) of this driving disk and a peripheral edge connected to said peripheral edge of the driving disk by radial rims that can be pressed against one of said contiguous indexing means to limit the rotation of said driving disk when said coupling means are in one of said predetermined angular positions.

11. A control device according to claim 1, characterized in that said rotary member includes two identical superposed triangular plates that are mounted on a shaft and the respective vertices of which are connected in pairs by rivets and carry circular section cylindrical rollers that are mounted on said rivets to rotate thereon and that form said indexing means.

12. A control device according to claim 1, characterized in that it includes means for limiting the torque transmitted by said motor unit to said driving disk, said means being disposed between the motor unit and the driving disk on an axis separate from said axis of the disks.

13. Use of a control device according to claim 1 for controlling high-voltage or medium-voltage electrical switchgear.

* * * * *